Sept. 21, 1943. C. M. HINES 2,329,761
VEHICLE BRAKE CONTROL SYSTEM
Filed Jan. 30, 1942
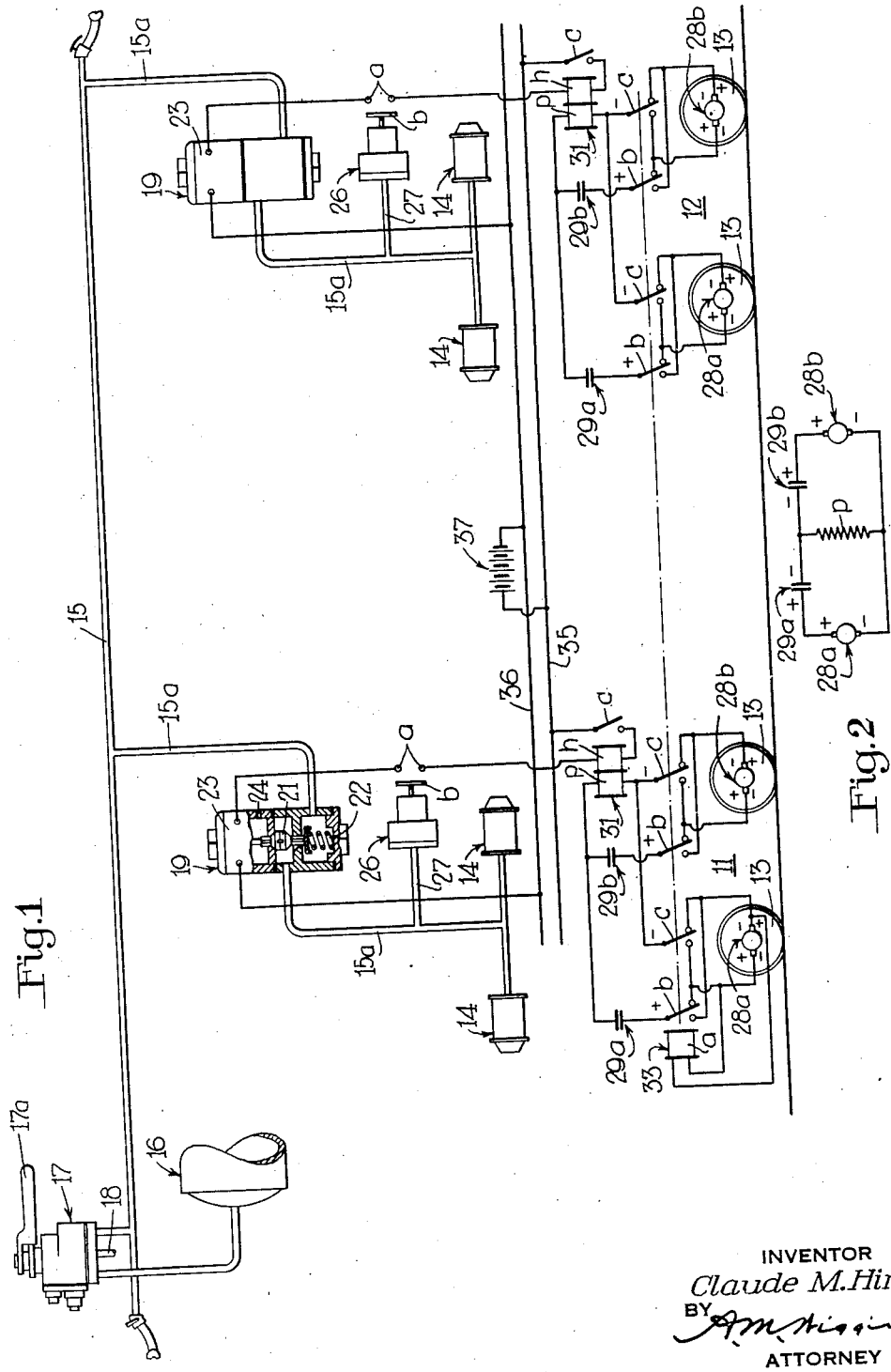
INVENTOR
Claude M. Hines
BY
ATTORNEY Patented Sept. 21, 1943

2,329,761

UNITED STATES PATENT OFFICE 2,329,761

VEHICLE BRAKE CONTROL SYSTEM

Claude M. Hines, Pittsburgh, Pa., assignor to The Westinghouse Air Brake Company, Wilmerding, Pa., a corporation of Pennsylvania Application January 30, 1942, Serial No. 428,803

7 Claims. (Cl. 303—21)

This invention relates to vehicle brake control systems and has particular relation to vehicle brake control systems having means for detecting the slipping condition of the wheels of the vehicle and for controlling the brakes associated with the wheels so as to prevent sliding thereof.

The term "slipping condition" as applied herein to a vehicle wheel refers to the rotation of the wheel at a speed less than a speed corresponding to vehicle speed at a given instant. When a slipping condition of a vehicle wheel occurs due to the degree of brake application exceeding the limit of adhesion of the wheel and the road surface or rail, the wheel decelerates at an abnormally rapid rate which is not attained when the wheel is not slipping. The rotative deceleration of a wheel at a slipping rate, that is, at a rate which occurs only when the wheel slips, is therefore positive indication of the slipping condition. It is therefore possible to detect the slipping condition of a wheel at its inception by means responsive to the rate of deceleration of the vehicle wheel.

The term "sliding condition" or "sliding" of a vehicle wheel refers to the dragging of a vehicle wheel along a road surface or rail in a locked or non-rotative condition and is thus not synonomous with the term "slipping condition."

In my prior Patent 2,208,738 there is disclosed electric decelerometer apparatus arranged to detect the slipping condition of vehicle wheels and operative to control the brakes in a manner to prevent sliding of the wheels. The decelerometer apparatus in this patent comprises a direct-current generator driven by rotation of a vehicle wheel unit (a single wheel or a pair of axle-connected wheels) and supplying a voltage substantially proportional to the rotational speed of the wheel unit, and a circuit connected across the terminals of the generator and including an electrical condenser and the winding of a relay. When the voltage of the generator increases the condenser is charged and the winding of the relay is energized by a current flowing in one certain direction and proportional to the rate of increase of voltage and consequently the rate of acceleration of the vehicle wheel. When the vehicle wheel decelerates, the condenser discharges a current in the reverse direction through the circuit substantially proportional to the rate of deceleration of the vehicle wheel. The relay winding is such as to cause an operative response of the relay only when energized by current discharged from the condenser and exceeding a certain value corresponding to a slipping rate of deceleration of the vehicle wheel.

The decelerometer apparatus is duplicated for each wheel unit and several operate in parallel to control the same brake control devices.

It is an object of my present invention to provide a vehicle brake control system having electric decelerometer apparatus of the generator-condenser type which is applicable to a plurality of vehicle wheels for the purpose of detecting the slipping condition of any of the wheels but which avoids the necessity of complete duplication of apparatus for all wheel units.

It is another object of my invention to provide an electric decelerometer apparatus of the type indicated in the foregoing object which is capable of performing the same functions as but which is simpler and less in cost than heretofore known types of apparatus for this purpose, such as that in my previously mentioned Patent 2,208,738.

The above objects and other objects of my invention which will be made apparent hereinafter are attained by means of apparatus subsequently to be described and shown in the accompanying drawing wherein Fig. 1 is a simplified diagrammatic view of a fluid pressure brake control equipment for the wheels of a railway car, which equipment embodies my invention and Fig. 2 is a simplified or equivalent circuit diagram representing the essential relation of parts of the electric decelerometer apparatus included in the brake control system of Fig. 1.

Description

Referring to Fig. 1, a simplified fluid pressure brake control apparatus of the familiar straight-air type is illustratively shown in connection with two wheel trucks 11 and 12 of a single car each of the wheel trucks comprises two wheel units, each unit including a pair of wheels 13 fixed at opposite ends of a connecting axle. Only one wheel of each wheel unit is shown for simplicity in the drawing. Although employed herein to designate a pair of axle-connected wheels, the term "wheel unit" may refer to a single wheel or any other number of connected wheels.

The brakes associated with the wheels 13 may be of any suitable type such as the conventional clasp-arranged shoes engaging the rim of the wheel and operated through the medium of brake levers or rigging in response to the supply of fluid under pressure to and the release of fluid under pressure from brake cylinders 14. Although any suitable number of brake cylinders may be provided, one brake cylinder is shown for each wheel unit in substantially vertical alignment above the corresponding unit.

In practice, fluid under pressure is supplied to the brake cylinders to effect application of the brakes and released from the brake cylinders to effect release of the brakes under the control of the operator by conventional fluid pressure brake control apparatus of well-known type. I have illustrated a simplified form of brake control apparatus of the straight-air type including a train pipe, hereinafter referred to as the control pipe 15, a source of supply of fluid under pressure hereinafter referred to as the main reservoir 16 and a brake valve 17 of the self-lapping type.

The brake valve 17 is of the well-known type described in detail and claimed in Patent 2,042,112 of Ewing K. Lynn and Rankin J. Bush and is therefore shown only in outline form and will here be but briefly described.

Brake valve 17 comprises suitable self-lapping valve mechanism having a rotary operating shaft to which an operating handle 17a is fixed. In the normal or brake release position of the brake valve handle 17a, fluid under pressure is exhausted from the control pipe 15 to atmosphere through an exhaust port and pipe 18 at the brake valve. Upon displacement of the brake valve handle in a horizontal plane out of its brake release position into its so-called application zone, the exhaust communication just mentioned is closed and a supply communication is established through which fluid under pressure is supplied from the main reservoir 16 to the control pipe 15. The nature of the self-lapping valve mechanism of the brake valve 17 is such that the pressure established in the control pipe 15 is substantially proportional to the degree of displacement of the brake valve handle out of its brake release position. The valve mechanism of the brake valve 17, moreover, possesses a pressure-maintaining feature for maintaining a pressure in the control pipe 15 corresponding to the position of the brake valve handle in the event that the pressure in the control pipe tends to reduce for any reason such as leakage.

The brake cylinders 14 for each of the wheel trucks are connected by corresponding branch pipes 15a to the control pipe 15, each of the branch pipes 15a having a magnet valve 19 interposed therein for a purpose hereinafter to be described.

Each magnet valve 19 is of a conventional double beat type having a double beat valve 21 which is biased to an upper seated position by a coil spring 22 and actuated to a lowered seated position in response to energization of a magnet winding or solenoid 23.

In its upper seated position, the double beat valve 21 establishes communication through the corresponding branch pipe 15a from the control pipe 15 to the corresponding brake cylinders 14. In its lower seated position, the double beat valve 21 closes communication through the branch pipe 15a and establishes communication whereby fluid under pressure is exhausted from the corresponding brake cylinders through an exhaust port 24 at a rapid rate.

It will thus be seen that as long as the magnet winding 23 of the magnet valve 19 is deenergized, the pressure in the corresponding brake cylinders 14 may be increased and decreased in accordance with the increase and decrease of pressure in the control pipe 15 under the control of the operator. When the magnet winding 23 of the magnet valve 19 is energized, the pressure in the brake cylinders 14 is rapidly reduced independently of the pressure in the control pipe 15.

A pressure responsive switch device 26 is provided for each wheel truck and is connected by a pipe 27 to the branch pipe 15a at a point between the brake cylinders and the magnet valve 19 so as to be subject at all times to the pressure in the brake cylinders 14.

The pressure switches 26 are preferably of a snap-acting type, such as shown in Patent 2,096,492 to Ellis E. Hewitt. Briefly, each pressure switch 26 comprises a pair of stationary insulated contacts $a$ and a movable contact $b$. As long as the pressure in the brake cylinders 14 is less than a certain value, such as fifteen pounds per square inch, the movable contact $b$ is actuated to its open position out of engagement with the associated contacts $a$. When the pressure in the brake cylinders 14 increases above fifteen pounds per square inch, the contact $b$ is actuated by snap-action into a closed position engaging the associated contacts $a$ and remains in such position as long as the brake cylinder pressure exceeds fifteen pounds per square inch. When the pressure in the brake cylinders reduces below fifteen pounds per square inch again, the contact $b$ is actuated by snap-action to its open position out of engagement with its associated contacts $a$. The purpose of the pressure switches 26 will be made apparent hereinafter.

According to my present invention, I provide electric decelerometer apparatus associated with the wheel units of each wheel truck for the purpose of controlling the magnet valve 19 for the corresponding wheel truck in a manner to cause it to effect a release of fluid under pressure from the brake cylinders in response to the inception of slipping of the wheels of that truck. The electric decelerometer apparatus comprises two direct-current generators 28a and 28b for each wheel truck, the generator 28a having its armature driven according to the rotation of one wheel unit and the generator 28b having its armature driven according to the rotation of the other wheel unit. Any desired arrangement for driving the armatures of the generators may be employed, for example, mounting the generators in the journal casing at the end of an axle and coupling the armature shaft of the generator in coaxial relation to the axle as indicated in the drawing.

The generators 28a and 28b may be of any suitable type adapted to produce a voltage substantially proportional to the rotational speed of the corresponding wheel unit. In the present instance it will be assumed that the generators 28a and 28b have permanent magnet steel cores, thereby eliminating the necessity for field windings. In a generator of this type, the polarity of the voltage at the terminals of the generator reverses automatically with the reversal in the direction of rotation of the armature for reasons well known.

The generators 28a and 28b of each of the wheel trucks are connected in cooperating circuit relation with two electrical condensers 29a and 29b and a relay 31.

The relays 31 are of the so-called uni-directional type having two separate windings $p$ and $h$ respectively and a single front contact $c$. Relays 31 are referred to as uni-directional relays because of the characteristic operation thereof, namely the operative response or pick-up thereof only in response to the flow of current exceeding a certain value through either winding $p$ or $h$ in one certain direction, the flow of current through the windings in the opposite direction being effective to restore the contact $c$ to its dropped-out position or maintain it firmly in its dropped-out position if already in such position.

In order to insure the proper operation of the relays 31 notwithstanding a reversal of polarity of the voltage at the terminals of the generators 28a and 28b, any suitable reversing switch mechanism may be provided. For purposes of illustration, I have shown a reversing relay 33 of the polarized type having a winding $a$ connected across the terminals of one of the generators, such as the generator 28a of truck 11 and a plurality of pairs of reversing contacts $b$ and $c$, each pair of contacts being effective to reverse the connections to the terminals of the corresponding generator 28a or 28b.

For purposes of the present invention, it will be assumed that the polarity of the voltage at the terminals of the generators during the forward travel of the vehicle is such as to cause the contacts $b$ and $c$ of reversing relay 33 to be maintained in their dropped-out positions shown and that a reverse travel of the car causes contacts $b$ and $c$ of reversing relay 33 to be actuated to their respective picked-up positions. As usual in the case of polarized relays, the contacts of reversing relay 33 remain in the position to which they are last actuated, independently of continued energization of the winding of the relay, until the direction of current through the winding is reversed.

The fundamental or equivalent circuit for the electric decelerometer apparatus of each wheel truck is shown in Fig. 2, it being understood that the contacts of the reversing relay 33 are omitted from the circuit for simplicity. It will be apparent on Fig. 2 that the two generators 28a and 28b of each wheel truck are connected in opposing parallel relation to each other, the two condensers 29a and 29b being connected in series relation between the generator terminals of like polarity and the winding $p$ of the relay 31 being connected at one end to the common terminals of the two condensers and at the other end to the remaining connected terminals of the two generators.

It will be apparent that when the vehicle or car is in motion, the condensers 29a and 29b are charged respectively to the voltage delivered by the corresponding generators 28a and 28b. The separate currents supplied to charge the two condensers both flow through the winding $p$ of the relay 31. The current supplied to charge each of the condensers varies substantially in proportion to the rate of increase of the voltage delivered by the corresponding generator 28a or 28b. Being thus energized by current which is the summation of the charging currents of the two condensers 29a and 29b, it will be apparent that the current energizing the winding $p$ is proportional to the rate of acceleration of the vehicle wheels 13 of the corresponding truck.

The connections of the winding $p$ of the relay 31 are such that the condenser charging current energizing the winding $p$ flows in such a direction as to bias the contact $c$ of the relay toward its dropped-out position. Accordingly, the relay 31 is not picked-up in response to acceleration of the vehicle.

When the vehicle decelerates, each of the condensers 29a and 29b discharges current through the winding $p$ and the armature winding of the corresponding generator 28a or 28b, the current discharged being substantially proportional to the rate of reduction of the voltage at the terminals of the generators. The winding $p$ of the relay 31 is accordingly energized by the summation of the currents separately discharged from the condensers 29a and 29b. In this instance, the current flows through the winding $p$ in the proper direction to cause pick-up of the contact of the relay.

The winding $p$ of relay 31 is so designed that as long as the car wheels 13 decelerate at a normal or non-slipping rate, for example a rate not exceeding four miles per hour per second, the current energizing the winding $p$ of the relay 31 is insufficient to cause pick-up of the contact of the relay.

Whenever either one or both of the wheel units of a given truck begin to slip and accordingly decelerate at an abnormally rapid rate exceeding a certain rate, such as ten miles per hour per second, the summation of the separate currents discharged from the condensers 29a and 29b and energizing the winding $p$ of the relay 31 exceeds that value required to cause pick-up of the contact of the relay and the contact is accordingly actuated to its picked-up position.

The winding $h$ of relay 31 is a self-holding winding effective, when energized, to maintain the contact $c$ of the relay in its picked-up position notwithstanding energization of the pick-up winding $p$ by a condenser charging current, as when one or more slipping wheel units accelerates back toward vehicle speed. As will be apparent in Fig. 1, the winding $h$ of each of the relays 31 is connected in series relation with the contact $c$ of the corresponding relay 31, the contacts of the corresponding pressure switch 26, and the winding 23 of the corresponding magnet valve 19 across a pair of bus wires 35 and 36 that are connected respectively to positive and negative terminals of a suitable source of direct-current voltage, such as the storage battery 37.

It will thus be apparent that if the contacts of a pressure switch 26 are in closed position when the contact $c$ of the relay 31 is picked-up, the winding $h$ of the relay 31 and the winding 23 of the magnet valve 19 are energized. The winding $h$ of the relay 31 is effective when energized to maintain the contact $c$ in its picked-up or closed position as long as the circuit across the bus wires 35 and 36 remains closed. As will be apparent hereinafter, the energization of the magnet winding 23 of the magnet valve 19 causes reduction of the pressure in the brake cylinders and a consequent opening of the contacts of the pressure switch 26 which interrupts the holding circuit including the winding $h$ of the relay 31.

*Operation*

Let it be assumed that the car is traveling under power with the brake valve handle 11a in its brake release position so that the brakes are released and that the operator desires to bring the car to a stop. To do so he first shuts off the propulsion power in the usual manner and then shifts the brake valve handle 11a out of its brake release position into its application zone an amount corresponding to the desired degree of brake application. The control pipe 15 and the brake cylinders 14 are thus charged to a corresponding pressure and the brakes are applied on the wheels to a corresponding degree.

As long as the wheels on the vehicle do not slip, no variation of the pressure in the brake cylinders 14 occurs except in accordance with variations of the pressure in the control pipe 15 effected under the control of the operator by means of the brake valve 17. If, however, when an application of the brakes is initiated or at any time during a brake application, one or more of the wheel units on the vehicle begin to slip, a further operation occurs which will now be described.

Let it be assumed that the wheels of the right-hand wheel unit of truck 11 begin to slip while the brakes are applied. In such case the voltage of the corresponding generator 28b rapidly reduces and the condenser 29b accordingly discharges a current through the winding $p$ of the relay 31 to cause the contact $c$ thereof to be actuated to its picked-up position.

The contact $c$ of the relay 31 is effective in its picked-up position to establish the circuit, previously described, for energizing the holding winding $h$ of relay 31 and the magnet winding 23 of the magnet valve 19 for wheel truck 11. The magnet valve 19 accordingly closes the communication through branch pipe 15a from the control pipe 15 to the brake cylinders 14 of the wheel truck 11 and causes fluid under pressure to be rapidly vented through the exhaust port 24 from the brake cylinders. The venting of fluid under pressure from the brake cylinders 14 continues until the pressure in the brake cylinders reduces below fifteen pounds per square inch. At such time, the movable contact $b$ of pressure switch 26 is actuated to its open position thereby interrupting the circuit for energizing the holding winding $h$ of relay 31 and the magnet winding 23 of magnet valve 19.

The reduction of the pressure in the brake cylinders 14 in response to the inception of the wheel-slip condition causes the slipping wheels to cease to decelerate and to accelerate back to a speed corresponding to vehicle speed without reducing in speed to a locked or sliding condition. Ordinarily the slipping wheels will be fully restored to vehicle speed before the contacts of the pressure switch 26 are restored to open position because the time required for the pressure in the brake cylinders to reduce sufficiently to cause the contacts of the pressure switch to open is longer than that required for the slipping wheels to be restored to vehicle speed. It will be obvious that the time contact $c$ of relay 31 remains picked-up and the time that the magnet winding 23 of the magnet valve 19 is energized will vary with the fluid pressure in the brake cylinders at the time the slipping condition begins. However, in most instances, the magnet winding of the magnet valve 19 will not be deenergized and restored to its normal condition until after the slipping wheels are fully restored to vehicle speed.

The contact $c$ of relay 31 is not restored to its dropped-out position in response to energization of pick-up winding $p$ thereof by current supplied to charge condenser 29b in response to acceleration of the corresponding wheel unit back toward vehicle speed because holding winding $h$ is energized by a current sufficient to maintain the contact $c$ picked-up.

It will thus be apparent that when the magnet valve 19 is restored to its normal condition restoring the communication through branch pipe 15a from the control pipe 15 to the brake cylinders 14, the corresponding build-up of pressure in the brake cylinders 14, and consequent closure of the contacts of the pressure switch 26 will not be effective to reenergize the magnet winding of the magnet valve 19 because the contact $c$ of the relay 31 will in the meantime have been restored to its dropped-out position due to the deenergization of the holding winding $h$ of relay 31.

Fluid under pressure is thus again supplied from the control pipe 15 to the brake cylinders 14 to cause reapplication of the brakes to a degree corresponding to the pressure established in the control pipe 15. However, due to the pressure-maintaining feature of the brake valve 17, the pressure in the control pipe 15 is maintained at a pressure corresponding to the position of the brake valve handle.

If the wheels of the right-hand wheel unit of wheel truck 11 again begin to slip upon reapplication of the brakes, the above cycle of operation is repeated so that at no time are the wheels permitted to reduce in speed to a locked condition and slide.

If during a brake application, the wheels of the left-hand wheel unit of wheel truck 11 begin to slip while the wheels of the right-hand wheel unit do not, the winding $p$ of the relay 31 is again energized sufficiently to cause pick-up of the contact $c$ thereof due to the abnormal current discharged from the condenser 29a.

If both wheel units of truck 11 begin to slip when an application of the brakes is initiated or at any time during a brake application pick-up winding $p$ is energized by the summation of currents discharged from the two condensers 29a and 29b and the relay 31 is thus picked-up in the same manner as when only one wheel unit begins to slip. When the slipping wheel units accelerate back toward vehicle speed in response to the release of the brakes caused by pick-up of relay 31, the current supplied to charge condensers 29a and 29b is not sufficient to overcome the effect of energizing the holding winding $h$. Consequently relay 31 does not drop-out until the pressure switch 26 opens to effect deenergization of the holding winding $h$.

It will thus be seen that the relay 31 is picked-up in response to the slipping of either one or both of the wheel units on truck 11 so that the degree of application of the brakes on the truck is substantially reduced and then automatically increased.

The operation of the decelerometer apparatus and the control of the brakes associated with the wheels of truck 12 is the same as that described for wheel truck 11 and is accordingly not repeated.

When the car comes to a stop, the relays 31 are always restored to their dropped-out position and consequently fluid under pressure is always supplied to the brake cylinders to maintain the brakes applied thereon. In order to start the car again, the operator must therefore restore the brake valve handle 17a to its brake release position to release the brakes.

If the car travels in a reverse direction, the contacts of reversing relay 33 are actuated to their picked-up position, thereby reversing the connections to the terminals of the generators 28a and 28b. It will thus be apparent that notwithstanding a reversal of polarity of the voltage at the terminals of the generators, the condensers are always subject to a charging voltage of uniform polarity so that the proper direction of flow of current through the winding $p$ for pick-up of the relays 31 occurs in response to the deceleration of the vehicle wheels.

It will be understood that while I have shown the equipment comprising my invention applied only to a single car, such equipment may be employed on each car of a train. In the case of a train of cars, it is preferable to provide, in the usual and well-known manner, suitable magnet valves on each car electrically controlled, through train wires by a master controller on a car such as the locomotive at the head of the train for effecting simultaneous variations of pressure throughout the length of the control pipe 15.

Having now described my invention, what I claim as new and desire to secure by Letters Patent is:

1. In a vehicle brake control system of the type having means under the control of the operator for controlling the application and release of the brakes associated with the vehicle wheels, the combination of a relay having a pick-up winding, means associated with a plurality of wheel units of the vehicle so arranged as to cause energization of said pick-up winding by an integrated current corresponding to the summation of a plurality of separate currents each of which is substantially proportional to the rate of rotative deceleration of a corresponding one of said plurality of wheel units, said pick-up winding being so constructed and arranged as to cause pick-up of the relay only when the total integrated current energizing it during the rotative deceleration of the wheel units exceeds a certain value occurring only when one or more of the wheel units rotatively decelerates at a rate exceeding a certain slipping rate, and means controlled by said relay effective to cause reduction in the degree of application of the brakes associated with said wheel units only so long as said relay is picked-up.

2. In a vehicle brake control system of the type having means under the control of the operator for controlling the application and release of the brakes associated with the vehicle wheels, the combination of a relay having a pick-up winding, means associated with a plurality of wheel units of the vehicle so arranged as to cause energization of said pick-up winding by an integrated current corresponding to the summation of a plurality of separate currents each of which is substantially proportional to the rate of rotative deceleration of a corresponding one of said plurality of wheel units, said pick-up winding being so constructed and arranged as to cause pick-up of the relay only when the total integrated current energizing it during the rotative deceleration of the wheel units exceeds a certain value occurring only when one or more of the wheel units rotatively decelerates at a rate exceeding a certain slipping rate, means controlled by said relay effective to cause reduction in the degree of application of the brakes associated with said wheel units only so long as said relay is picked-up, means effective upon pick-up of said relay for maintaining said relay picked-up thereafter independently of the pick-up winding, and means responsive to the reduction of the application of the brakes associated with said wheel units below a certain degree for causing restoration of said relay to its dropped-out position.

3. In a vehicle brake control system of the type having means under the control of the operator for controlling the application and the release of the brakes associated with the vehicle wheels, the combination of a relay having a pick-up winding and a holding winding, means associated with a plurality of wheel units of the vehicle so arranged as to cause energization of said pick-up winding by an integrated current corresponding to the summation of a plurality of separate currents each substantially proportional to the rate of rotative deceleration of a corresponding one of said plurality of wheel units, said pick-up winding being so constructed and arranged so as to cause pick-up of the relay only when the total integrated current energizing it during rotative deceleration of the wheel unit exceeds a certain value occurring only when one or more of the wheel units rotatively decelerates at a rate exceeding a certain slipping rate, electroresponsive means effective when energized to cause a continuing reduction in the degree of application of the brakes associated with said wheel units, said relay being effective when picked-up to establish a self-holding circuit for said relay including the said holding winding thereof and said electroresponsive means, and means responsive to the reduction of the application of the brakes associated with said wheel units below a certain degree for interrupting the said self-holding circuit of the relay whereby to cause restoration of said relay to its dropped-out position and deenergization of said electroresponsive means.

4. In a vehicle brake control system of the type having means under the control of the operator controlling the application and release of the brakes associated with the vehicle wheels, the combination of a relay having a pick-up winding, a plurality of voltage sources each associated with a corresponding one of a plurality of vehicle wheel units for supplying a direct-current voltage substantially proportional to the rotational speed of the corresponding wheel unit, an electrical condenser for each of said voltage sources, means associating said voltage sources, said condensers and the pick-up winding of said relay in such a manner that each of said condensers discharges a current through the pick-up winding of said relay proportional to the rate of reduction of the voltage supplied by the corresponding voltage source, said pick-up winding being so constructed and arranged so as to be effective to cause pick-up of the relay only when the summation of the separate currents discharged from said condensers exceeds a certain value occurring only when one or more of said wheel units rotatively decelerates at a rate exceeding a certain slipping rate, and means controlled by said relay and effective in response to pick-up of said relay to effect a reduction in the degree of application of the brakes associated with said wheel units.

5. In a vehicle brake control system of the type having means under the control of the operator controlling the application and release of the brakes associated with the vehicle wheels, the combination of a relay having a pick-up winding, a plurality of voltage sources each associated with a corresponding one of a plurality of vehicle wheel units for supplying a direct-current voltage substantially proportional to the rotational speed of the corresponding wheel unit, an electrical condenser for each of said voltage sources, means associating said voltage sources, said condensers and the pick-up winding of said relay in such a manner that each of said condensers discharges a current through the pick-up winding of said relay proportional to the rate of reduction of the voltage supplied by the corresponding voltage source, said pick-up winding being so constructed and arranged so as to be effective to cause pick-up of the relay only when the summation of the separate currents discharged from said condensers exceeds a certain value occurring only when one or more of said wheel units rotatively decelerates at a rate exceeding a certain slipping rate, means controlled by said relay and effective in response to pick-up of said relay to effect a reduction in the degree of application of the brakes associated with said wheel units, means effective once said relay is picked-up for maintaining it picked-up independently of said pick-up winding, and means responsive to the reduction of the application of the brakes associated with said wheel units below a certain degree for causing drop-out of said relay.

6. In a vehicle brake control system of the type having means under the control of the operator for controlling the application and the release of the brakes associated with the vehicle wheels, the combination of a relay having a pick-up winding and a holding winding, a plurality of voltage sources each associated with a corresponding one of a plurality of wheel units for supplying a direct-current voltage substantially proportional to the rotational speed of the corresponding wheel unit, an electrical condenser for each of said voltage sources, means associating said sources, said condensers and the pick-up winding of said relay in such a manner that each condenser discharges a current through the pick-up winding substantially proportional to the rate of reduction of voltage supplied by the corresponding voltage source, said pick-up winding being so constructed and arranged as to cause pick-up of the relay only when the total current energizing it during rotative deceleration of the wheel units exceeds a certain value occurring only when one or more of the wheel units, rotatively decelerates at a rate exceeding a certain slipping rate, electroresponsive means effective while energized during a brake application to cause a continuing reduction in the degree of application of the brakes associated with said wheel units and effective when dropped-out to cause reapplication of the brakes associated with said wheel units, said relay being effective when picked-up to establish a self-holding circuit including said holding winding thereof and the said electroresponsive means whereby to maintain said relay picked-up and said electroresponsive means energized, and means responsive to the reduction of the application of the brakes associated with said wheel units below a certain degree for interrupting said holding circuit to cause deenergization of the holding winding of said relay and of said electroresponsive means whereby to cause restoration of said relay to its dropped-out position and reapplication of the brakes on said wheel units.

7. In a vehicle brake control system of the type having a fluid pressure responsive means to which fluid under pressure is supplied to effect application of the brakes and from which fluid under pressure is released to effect the release of the brakes associated with a plurality of wheel units of the vehicle, the combination of a relay having a pick-up winding and a holding winding, means associated with said plurality of wheel units so arranged as to cause energization of said pick-up winding by an integrated current corresponding to the summation of a plurality of separate currents each substantially proportional to the rate of deceleration of a corresponding one of said plurality of wheel units, said pick-up winding being so constructed and arranged as to cause pick-up of the relay only when the total current energizing it during rotative deceleration of the wheel units exceeds a certain value occurring only when one or more of the wheel units rotatively decelerates at a rate exceeding a certain slipping rate, electroresponsive means effective while deenergized to establish a communication through which fluid under pressure is supplied to the said fluid pressure responsive means and effective while energized to interrupt the supply of fluid under pressure and to vent fluid under pressure from said fluid pressure responsive means, said relay being effective when picked-up to establish a self-holding circuit including the said holding winding thereof and the electroresponsive means whereby to maintain said relay picked-up and said electroresponsive means energized, and means responsive to the reduction of the pressure acting on the fluid pressure responsive means below a certain value for interrupting the self-holding circuit of the relay to cause deenergization of the holding winding and a consequent restoration of said relay to its dropped-out position as well as the deenergization of the electroresponsive means and the consequent restoration of the communication through which fluid under pressure is supplied to the fluid pressure responsive means.

CLAUDE M. HINES.